(12) United States Patent
Strand et al.

(10) Patent No.: US 7,562,465 B2
(45) Date of Patent: Jul. 21, 2009

(54) PROCESS AND MEANS FOR DRYING OF STICKY MATERIALS

(75) Inventors: Asbjørn Strand, Bønes (NO); Jon Alsaker, Rådal (NO)

(73) Assignee: Fjell Industrier AS, Straume (NO)

( * ) Notice: Subject to any disclaimer, the term of this patent is extended or adjusted under 35 U.S.C. 154(b) by 0 days.

(21) Appl. No.: 10/477,617

(22) PCT Filed: May 16, 2002

(86) PCT No.: PCT/NO02/00177

§ 371 (c)(1),
(2), (4) Date: May 12, 2004

(87) PCT Pub. No.: WO02/093094

PCT Pub. Date: Nov. 21, 2002

(65) Prior Publication Data

US 2004/0200091 A1    Oct. 14, 2004

(30) Foreign Application Priority Data

May 16, 2001    (NO) .................................. 20012402

(51) Int. Cl.
*F26B 11/00*    (2006.01)
(52) U.S. Cl. ........................................................ 34/184
(58) Field of Classification Search ................... 34/136, 34/369, 60, 184, 186, 389, 360, 134, 135
See application file for complete search history.

(56) References Cited

U.S. PATENT DOCUMENTS

| | | | | |
|---|---|---|---|---|
| 3,057,076 A | * | 10/1962 | Ofner | 34/389 |
| 3,808,701 A | * | 5/1974 | Bachmann | 34/179 |
| 4,099,336 A | * | 7/1978 | Maffet | 34/389 |
| 6,125,549 A | * | 10/2000 | Pikus | 34/267 |

* cited by examiner

*Primary Examiner*—Kenneth B Rinehart
(74) *Attorney, Agent, or Firm*—Francis C. Hand; Garella, Byrne, Bain et al.

(57) ABSTRACT

A process and means for drying sticky or gluey materials uses an arrangement of rotor arms that are adjusted so that feed materials are rapidly mixed into the bed material. The moisture content of the bed material is kept below the moisture limit of the glue zone.

19 Claims, 5 Drawing Sheets

PROCESS AND MEANS FOR DRYING OF STICKY MATERIALS

The present invention relates to a process for drying of sticky, liquid-containing materials, and drying means for same.

Drying/dewatering of gluey or sticky materials represents a considerable problem within the drying technology, and there are no known technical solutions within the prior art that solves this problem satisfactorily.

Typical materials which display such gluey characteristics are moist materials within animal and vegetable processing, and different forms of residual sludge, such as different forms of industrial sludge, sludge from biological effluent treatment plants and sludge from column residues from alcohol production.

Within certain ranges, which are described in more detail below, the gluey or sticky substances display the characteristic during drying (dewatering) of gluing together all the substances in the material which shall be dried to one or several large dough-like clumps, so that the surface of the material which shall be dried becomes small and the shear forces which are required to break these lumps apart again become large. In addition such sticky materials will stick to the heating surfaces of the drying device.

Presently, there are devices and methods that can be used to dry such material, but the technology is in no way satisfactory, and it is therefore an aim of the present invention to provide a process and a means where the drying or dewatering process is substantially improved.

An approach for drying such gluey or sticky material which is known within the prior art is to use rotating drying devices, for example the rotadisc dryer from Stord Bartz AS and the rotating coil drier, called "Multicoil" from Kvaerner. The aim of such rotational movement is to generate larger friction forces between the material that shall be dried and the drying device itself.

However, this technology has not shown itself to be sufficiently suitable and it is known that one must either use a high degree of re-circulation of the material that is already dry or one must blend in other materials, typically fibrous materials, so that the fraction of gluey material is kept below a certain level.

An aim of the present invention is thus to provide a process for drying of such gluey or sticky material where it is not necessary to re-circulate a fraction of already dried material, and where it is not necessary to mix in further material such as fibrous materials either.

An alternative method to dry such sticky material is to prepare the material so that it flows easily and can be pumped, distribute it in small drops and thereafter dry it quickly in a stream of air, as it is described in the drying process in which one uses a spray drier as described in GP 589544 by Niro Atomizer AS.

However, the disadvantage of using the above-mentioned spray drier for such materials is that the use of energy-economic mechanical and thermal dewatering, such as evaporation and thickening, before the drying cannot be optimal, as a spray drier must have a low viscosity fluid material to work with. Furthermore, the drying temperature must be kept low, something which has a negative effect on the heating economics. The energy consumption is largely inversely proportional to the difference between inlet and outlet temperatures of the drying medium, and will thus increase at low inlet temperature. Low inlet temperature is necessary due to fire risk.

A third alternative is to use a drum dryer or a scraping dryer for drying of such sticky material, for example, the type which is described in patent GB 1085191 by Goudsche Machf NV. However, such dryers have been found not to be suitable for automatic operation, and cannot be built into large capacity installations. The result is therefore that one must have many such drum driers and a large labour force, which is not compatible with today's demands for automation.

The present invention comprises an improved friction dryer. NO 176.006 describes a hammer mill-like friction drier for drying of various sludge types. The liquid in the sludge material is removed as finely distributed drops, like a mist, as the material is exposed to an artificial gravitational field. Vibration forces are induced in the gravitational field which is suitable for ripping up the liquid to form the mist. The means that is described is characterised in that it uses swinging rotor blades, and that the processing chamber is arranged with axially oriented fins.

Furthermore NO 155832 describes a process in which it is possible to obtain evaporation at a lower temperature than for normal evaporation in that the capillary forces which bind the individual fractions in the pores of the sludge are broken down in a friction evaporator. Furthermore, the process is characterised in that the steam which comes from the friction evaporator is condensed with cooled condensate. The means that is described is a typical hammer mill with rotor hammers that can swing and longitudinal fins in the stator.

The disadvantage with these solutions is that sludge material which shall be dried, is crushed to finely distributed particles and leads to more particulate material being dragged along in the exhaust gas stream. It is an aim of the present invention to provide a process and means in which the sludge material is subjected to a reduced grinding process or no grinding at all. This is achieved according to the present means by removing the longitudinal fins and the swinging rotor arms.

Furthermore, provided with the present invention, as mentioned above, is a new process for drying of sticky materials. Drying of such materials is not known for the abovementioned friction drier, and the processes for drying of such sticky material which are known within the prior art are the driers which are mentioned above and then preferably the indirect dryers, i.e. those that used hot surfaces and a heat medium.

Thus it is clear that today's available techniques do not provide satisfactory solutions for how such sticky liquid-containing material can be dried effectively. To get a better understanding a description of such sticky material is given below.

As mentioned above, during the drying process a so-called glue-zone is formed, and it is in this zone that the problems arise. We have described the different phases in a general drying process for sticky material in FIG. 1. Broadly speaking there are three different phases or zones, namely a wet zone, a glue zone and finally a dry zone. The heat-technical and physical processes that take part are indicated along the y-axis as shear forces and heat transfer numbers respectively. It can be clearly seen that in the glue zone the shear forces must be substantial, while at the same time the heat transfer values are low.

Figure 1:
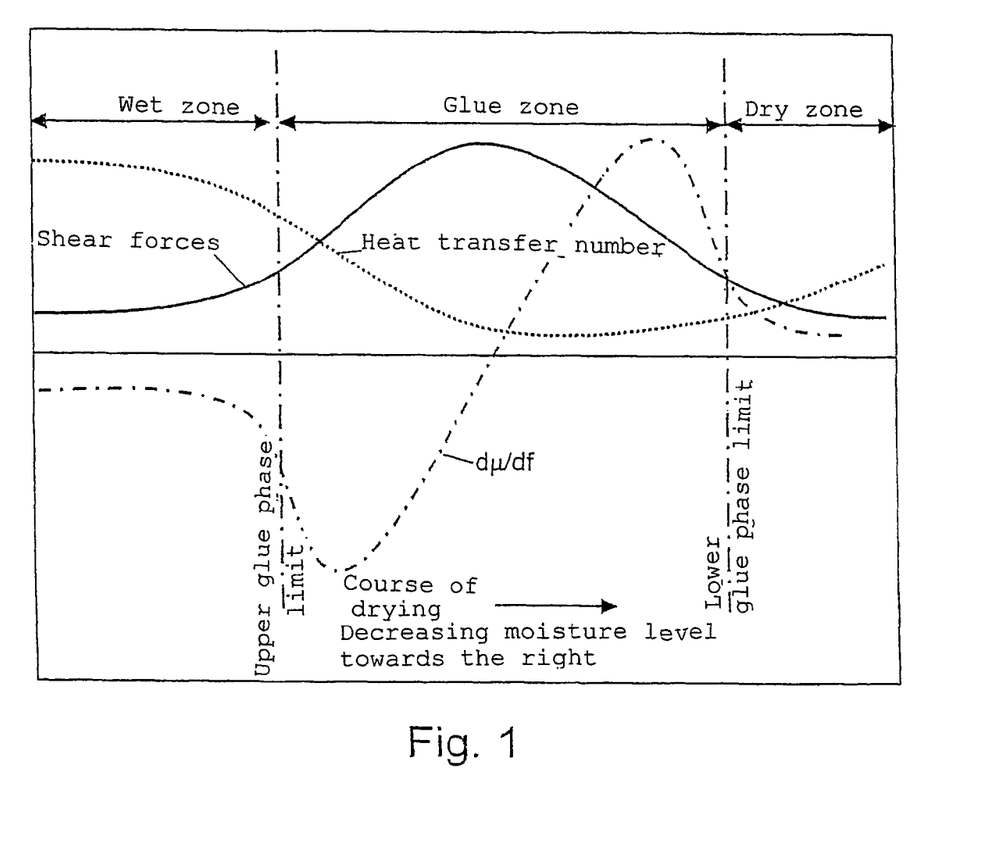
FIG. 1 shows the different phases that exist in drying of sticky material.

In the introductory dewatering process (to the left on the x-axis), described as "wet zone", the content of water and possibly other liquids, for example fats, dominate. The considerable content of liquid dominates the physical characteristics of the material in this zone, and this is represented by the heat transfer (i.e. the dewatering and drying itself) being good, at the same time as the shear forces that are necessary being relatively low. In this phase the concentration of glue material related to the total material is limited, and below a value where the glue properties represent a technical problem for the drying.

When sufficient amount of liquid is removed during the drying process, the phase which we have called "glue zone" in FIG. 1 commences. In this phase, the effect of the glue forces is noted in many ways. Those particles which shall be dried, will often clump together in large clumps in the "glue zone", possibly to one large clump only. Furthermore, those forces that are necessary to rip up these clumps will be very large, typically 5-10 times the force which is necessary to break up the matter in the "dry zone".

Without being tied to a definite theory, it is assumed that the mechanism which gives rise to the drying process is an evaporation from "solid matter surfaces" in the material. When the material starts to clump together, the number of such particles is reduced and the total surface area that is available for evaporation of liquids will be reduced, and the drying process will be less effective.

Furthermore, if an indirect dryer such as the rotating dish dryer or drum dryer is used, the two above-mentioned problems are also associated with deposits of a gluey layer on the heating surfaces.

Thus, the "glue zone" is associated with low values for heat transfer and large resistance to rotating movement. Furthermore, a coating will be formed on the heating surfaces if an indirect dryer is used.

The starting material which one normally wishes to dry has a liquid content of the order of 50 to 90 percent. Examples are sludge from the alcohol industry (50-85% liquid), sludge from municipal effluent treatment plants (60-90% liquid) and ethanol-containing sludge from the starch industry (50-80% alcohol).

When the drying commences, the liquid content is gradually reduced and at a given liquid content, which is decided among other things by type of material, the sticky substances this contains etc, one will go from "wet zone" to "glue zone". The latter zone will often be encountered when the material has a liquid content of the order 50-70 percent residual moisture, normally around about 60%.

However, the term "glue zone" as it is used in the present invention, is not a quantitative term, but a more qualitative designation which is characterised in that the glue effect of the gluey substances in the material start to dominate the physical properties of the material. This can be measured, for example, as reduced heat transfer or as an increase in the shear forces that are necessary to dry the material further.

The simplest way to describe or determine this phase is by measuring the dynamic viscosity of the material through the whole drying process. If one sets up a curve for $d\mu/df$, where $\mu$ is dynamic viscosity and f is moisture content (see FIG. 1), this curve will show a characteristic drop at the entry to the glue zone as a result of the viscosity of the material strongly increasing (drop as the differential df has a negative value).

If one removes even more water, typically to a water content of around 30-40% residual moisture, the glue effect will decrease again and the material will start to disintegrate. Because of this, the area of the total surface will increase. The drying capacity will also increase, and the shear forces decrease again. This is characteristic for what is termed the "dry zone".

As mentioned, it is the glue zone that causes problems in connection with drying of sticky or gluey materials. The most common method which is known within the prior art to avoid the above mentioned problems in rotary driers is to recycles already dried material in an external or internal mixing device. The amount of returned dried material must be sufficient for the average moisture content in the whole reactor not to enter the zone which is described above as the "glue zone". A typical mixing ratio when it concerns amount of dried material in relation to wet material is of the order 3:1 to 5:1. For example, if a given material has a glue zone with the material having a residual moisture content in the area 60-40%, then one mixes in, for example when the material has a residual moisture content of 65%, an amount of dry material sufficient for this mixture of the two materials to have a residual moisture content below 40%. The mixture will thereby end up in the "dry zone" in which the shear forces are manageable, and the heat transfer is acceptable.

If, in a continuously working rotating drying device, one should attempt to dry a gluey mixture without re-circulation, a part of the mixture would at any time be in the "wet zone" with conditions of a relatively high heat transfer and small shear forces. However, a part of the product would be in the "glue zone" in which the shear forces, noticeable as resistance to rotation, or power consumption for the drive motor, would be very high. Similarly, a part of the product would at any given time be in the "dry zone" with little resistance to rotation, but with poor heat transfer numbers.

The demands to overcome the shear forces in the "glue zone" would be so high and require such a large drive motor for the rotation that an installation based on such a principle would be very impracticable.

Typical dryers which initially are built to work with gluey materials are rotary dish dryers such as the rotadisc dryer from Stord Bartz and the multicoil dryer from Kvaerner. These are originally fitted with gadgets to break down the abovementioned clumps in the "glue zone", for example in the form of struts between the dishes.

However, the total power required is in most cases so large that such a direct drying course cannot be carried through.

A typical rotating dish dryer with 60 dishes would, with a stable, continuous operation, use 5-10 of its dishes to work on material which can be characterised as being in the "wet zone". Around 20-30 dishes would work on material that is in the "glue zone" and 20-35 dishes would work on material that is in the "dry zone".

The abovementioned number of dishes in the "glue zone" is so high that the size of the required drive motor would be impractically large, and even a dish dryer with gadgets to break down glue would, in most cases, have to work with re-circulation of dry matter, or addition of a non-gluey material.

We have now given a description of the prior art and the central point is that today's technology does not encompass solutions in which a sticky material can be dried effectively without a part of the already dried material being led back into the process, and/or that other materials are added, often termed carriers, to lead the material directly from the "wet zone" to the "dry zone".

With the present invention, a solution is provided in which one avoids that the material which shall be dried is in this "glue zone". The principle on which the invention is based is completely different from what is known within the prior art.

Thus, it is an object of the present invention to provide an improved drying of sticky material, where special problems which are associated with drying in the so-called glue phase are avoided. Furthermore, it is an object of the present invention to avoid these problems without adding already dried material, or a form of carriers.

It is a further object of the present process to be able to be used on already existing rotating drying devices.

These and other objects of the present invention will be explained further below, with reference to the enclosed figures, in which.

As can be seen in FIG. 1 and the description given above, it is absolutely critical that the glue zone is avoided, or reduced substantially during the drying process.

Thus, the process according to the invention is characterised in that it encompasses the steps:

a) that the processing chamber of the drying means comprises an amount of material $$M(t) = \int_V \rho \cdot dV$$

with a moisture content $$F(t) = \frac{1}{M} \int_v \rho f \cdot dV,$$

where $F(t) < f_g$, with $f_g$ being the lower limit of the glue phase, and b) that to this amount of material $M(t)$ is added an amount of material $m_1$ with a moisture content $f_i$, where $f_i > f_h$, where $f_h$ is the upper limit of the glue phase, and c) that the relationship between $m_i * f_i$ and $M(t) * F(t)$ is regulated so that $F(t) < f_g$ and d) that a sufficiently fast mixing is established so that $f(X,t) < f_g$.

Furthermore, the present invention comprises a means for drying of liquid-containing material comprising a processing chamber with at least one inlet opening, and a rotor mounted in the processing chamber, with an annular space for taking up the material which is to be dried being established between the inner surfaces of the processing chamber and the outer surfaces of the rotor, characterised in that the rotor comprises a number of inside the inner surfaces of the processing chamber, and that the inner surface of the stator is smooth.

With the present invention the glue zone is avoided in that the amount of liquid material which is fed into the rotating dryer is dosed so that the amount which is in the dryer at any time has approximately the same moisture level throughout, and that this moisture level does not come near the given limits for the glue activity.

To visualise the concept that lies behind the invention one can say that a small portion of moist material is rapidly mixed with a large amount of dry material. The residual amount of water in the whole amount of material (large amount of dry material plus a small amount of moist material) will only increase negligibly. This increase is so small that the whole material will remain in the "dry zone". Furthermore, the heat transfer is sufficiently effective for the mass of water in the moist material being, in practice, removed immediately.

To understand this mechanism better, one can imagine the process carried out in the defined sequences as described below.

1) The bed of material in the dryer has a certain moisture content ($f_1$) at the beginning of a new rotation.
2) We can assume that the feeding of a given amount of moist material will be instantaneous. Mixing of wet material with material already in the machine will be virtually instant.
3) The new mixed moisture level of the new moist material fed in and material that is already in the machine is ($f_2$)
4) Heat transfer and evaporation go on for the rest of the time before the rotor starts a new rotation.
5) The output process takes place instantaneously at the end of the rotation, and after the fluidised bed principle, i.e. excess material is taken out.

One can imagine that the feeding, which in reality is continuous, takes place in that a given segment of new wet material is fed in per rotation of the rotor. The content of dried and partially dried material in the machine will, because of a very fast rotation, lie as a rotating ring around the inner periphery of the machine.

The heat transfer into the material will be direct because of the transfer of the kinetic energy which the rotor will supply to the material. The mechanism is that the rotor continuously supplies larger kinetic energy to a certain part of the material in the bed than the average kinetic energy in the bed material. This energy is thereafter converted to heat energy when the particles lose their kinetic energy in collision with other particles in the bed or with the static part of the construction.

Figure 2:
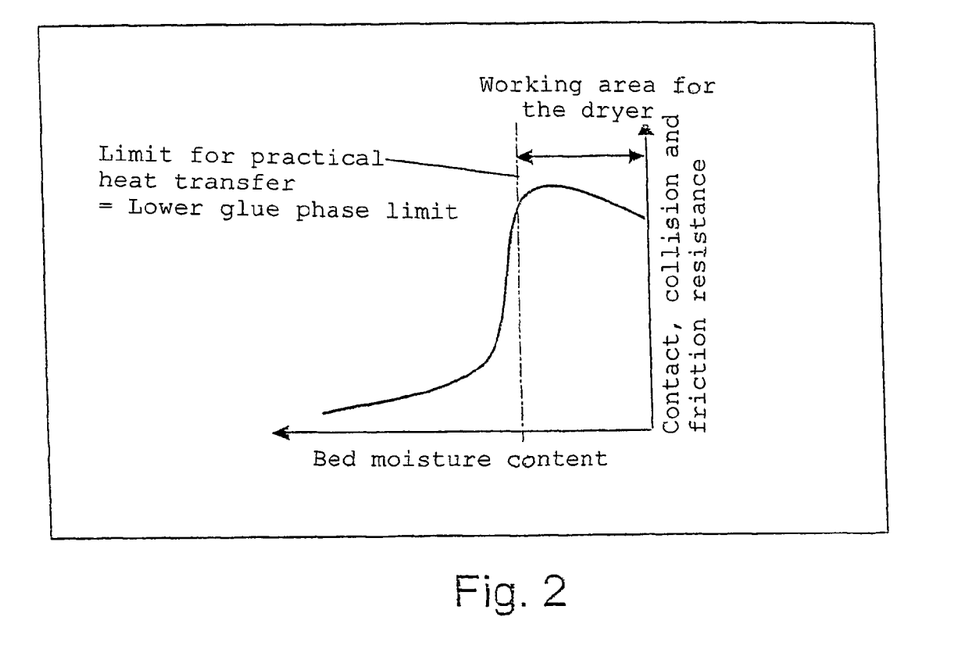
FIG. 2 shows in a schematic form a practical working area for a drying process in accordance with the present invention.
Figure 3:
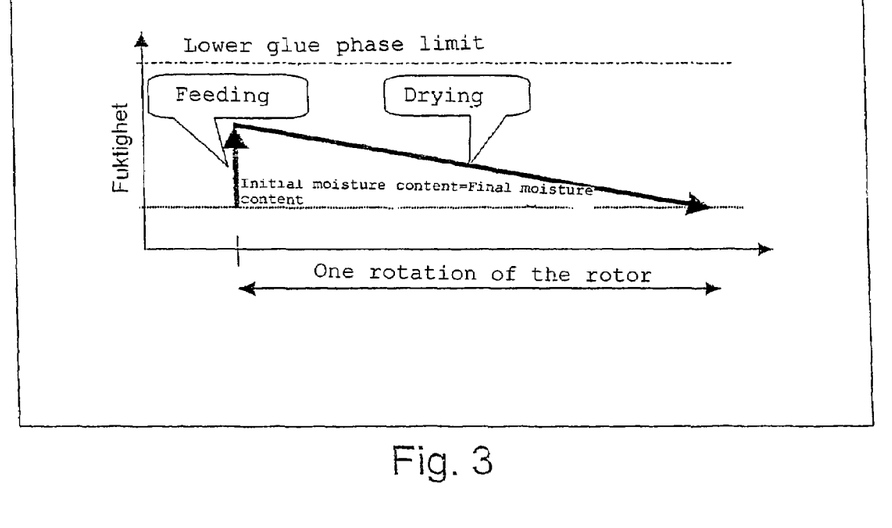
FIG. 3 shows a principle description of the moisture course per rotation of the rotor.
Figure 4:
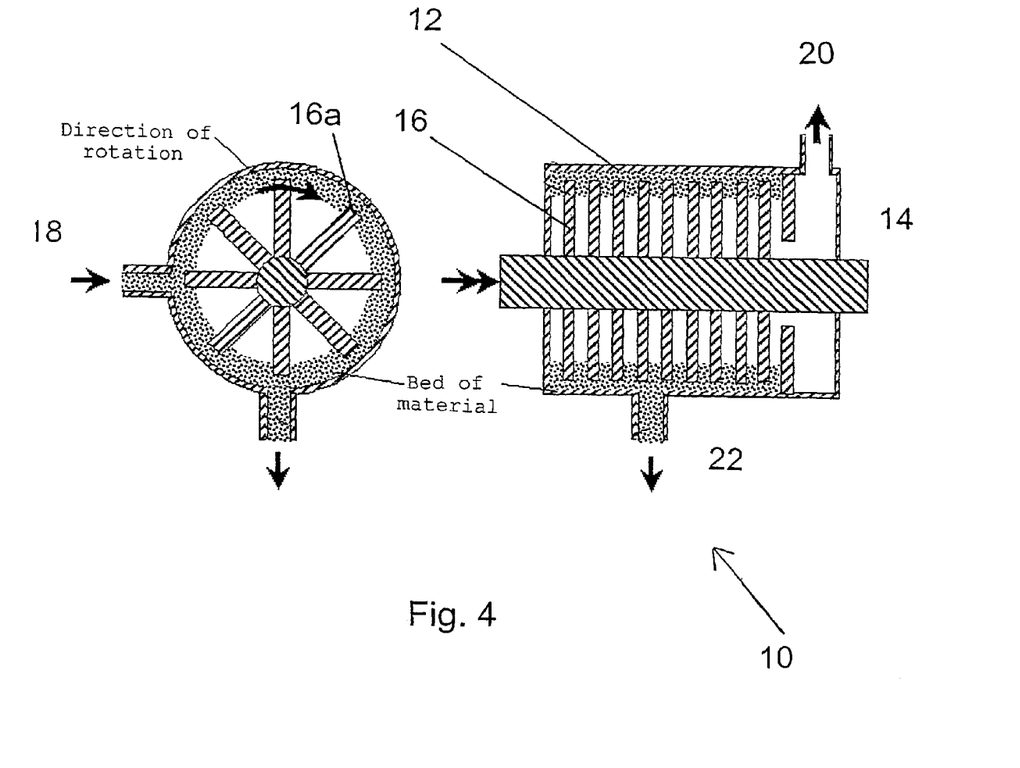
FIG. 4 shows a principle diagram of a drying means according to the invention.
Figure 5:
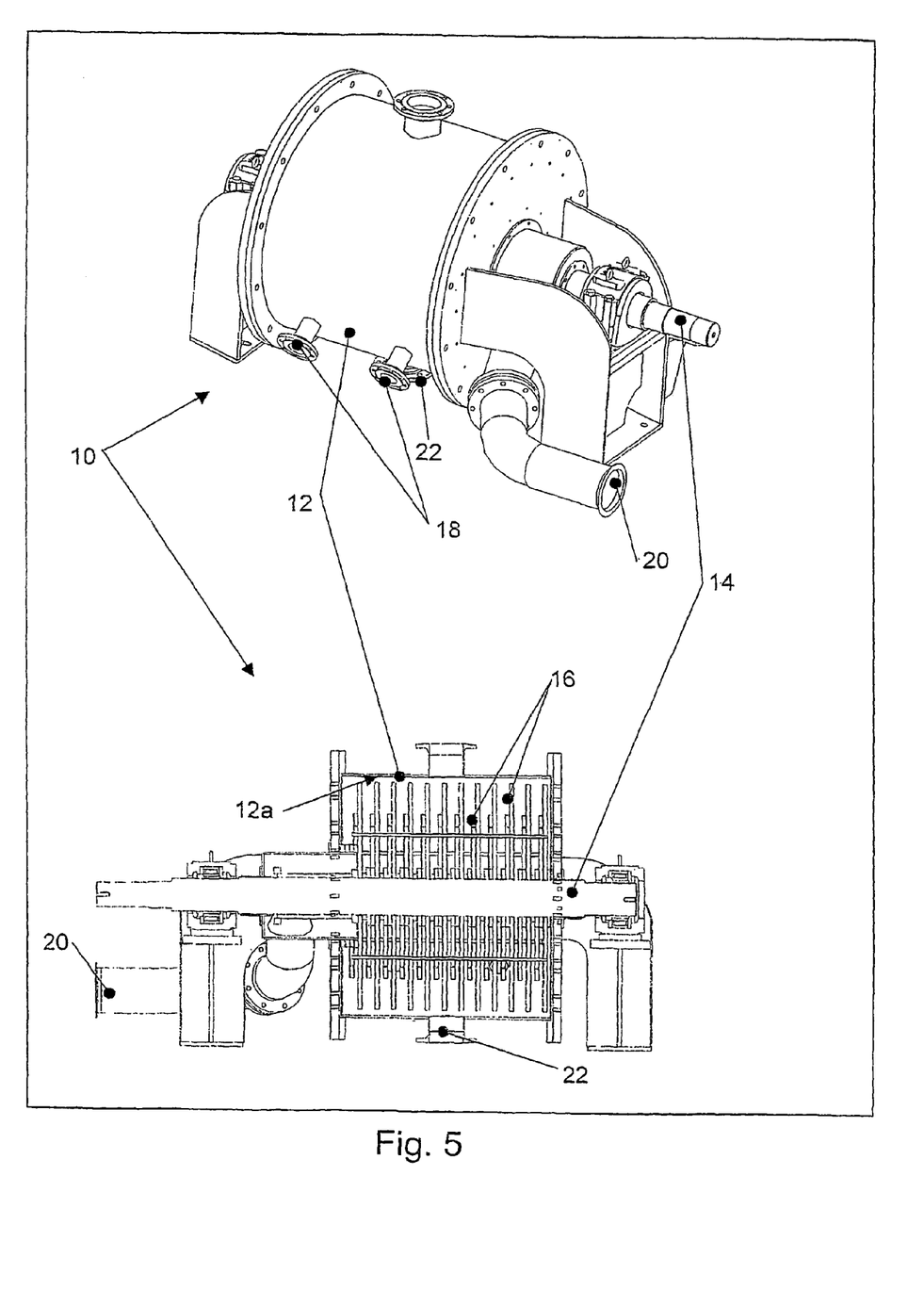
FIG. 5 shows as a drawing and a section an embodiment of a means according to the invention.

This heat transfer will be very fast. As long as the dry bed is below a certain moisture level, the collision resistance between particles and the friction resistance between the rotating arms and the bed of material will be substantial, see FIG. 2. This resistance will, as mentioned above, go directly over to heat and thus lead to a very fast evaporation of free and bound water in the material (plus any other volatile compounds).

In the feeding of new wet material into the existing bed, the new segment of material that is fed in very fast is rapidly mixed into the total material in the bed both tangentially, radially and axially.

If the feeding is kept at such a rate that the new moisture level for the mixture lies inside the working range of the dryer (see FIG. 2) and at the same time below the glue phase limit of the product, i.e. in the "dry zone", then the fast evaporation will ensure a final moisture level identical with the moisture level of the bed at the moment of feeding. The material in the bed will not enter the glue phase. If the moisture content gets near the limit of the glue phase, then the load drops as a result of the material sticking together and getting attached to the static parts of the dryer. The method presupposes that at any given time the material is kept so dry that the bed of material can be described as freely moving particles with little adhesion to each other, i.e. that the material is in the "dry zone" at all times.

With the sequential description that is given in the points 1-5 above, one can then with the following assumption set up the conditions for operation outside the glue zone:

a represents the evaporation per rotation of the rotor, $m_i$ is the amount (for example in kg) of material fed in per rotation and $f_i$ is the moisture content of this material, $m_u$ is the amount of output material per rotation, $f_2$ is the moisture content of the mixture after the feeding, but before any water has evaporated and $f_g$ is the glue phase limit.

1) $f_u < f_g$
2) $a < m_i * f_i - m_u * f_u$

In reality, the processes take place simultaneously. To succeed, a correct balancing of the processes and a certain relationship between the characteristic time constants for the different processes is required. Characteristic time for mixing of the incoming wet material into the dry bed of material must be considerably less than the characteristic residence time of the dry material in the bed. At the same time, the generation of friction heat in the bed of material must be balanced carefully with the feeding of the wet material so that the material bed has a small surplus of inner heat at all times which cart be delivered to evaporation of incoming moisture, that is to say, the amount of evaporated moisture balances the amount of moisture in the added amount of material.

Therefore, a dryer which shall satisfy the above-mentioned conditions must:
1) Have mechanical gadgets which mix the incoming and existing material approximately instantaneously.
2) Have a very fast heat transfer
3) Allow dosing of the material in such a way that the moisture content of the mixed material must not come near the limit of the glue zone.

Thus, the present invention also relates to a drying means (10). In practice, the means (10) can be made as a cylindrical processing chamber (12) (stator) with an internally mounted rotor (14). The rotor (14) is equipped with a number of rotor arms (16) which end of a short distance inside the static cylindrical container (12).

For the most common types of materials which one wishes to dry, and with rotor arms (16) made from conventional steel alloys, one can give the following construction characteristics of the drying means (10):
1. Diameter of cylindrical processing chamber: 0.5-5 m, typically around 1 m.
2. Tangential velocity at the tip of the rotor arms: 10-100 m/s, typically around 35 m/s.
3. Radial clearance between the wall of the processing chamber and rotor: 0-0.1 m, typically about 0.03 m.
4. Number of rotor arms (16) in relation to area of the cylindrical inner wall of the processing chamber (12): 10-100 per m$^2$, typically about 30 per m$^2$.
5. Total projected front area (16a) for the part of the rotor arms that is in ingress with the bed of material viewed in the direction of movement in relation to the total volume of the bed of material: 0.1-1 m$^2$/m$^3$, typically about 0.5 m$^2$/m$^3$.

The length of the processing chamber (12) and the dimensions of the rotor arms (16) in tangential direction are of less importance for the processing. The directions for these will be given by the mechanical strains the construction must withstand, and the demands for effective removal of the steam that is generated in the material bed. By increasing the tangential velocity, considerable possibilities for varying the different parameters defined above are obtained. In today's conventional solutions this is limited because one wishes to restrict the wear and tear of the rotor arms, which are made from steel onto which is placed a hard covering containing wolfram carbide. Reduced claims of wear and tear or introduction of more lasting materials can open up for work in other areas than those indicated above.

It is most important for the drying means (10) that it is constructed so that the three basic physical processes of mixing, heat generation and evaporation are in correct relation to each other. To obtain sufficient heat generation by means of forces of internal collisions, contact and friction, it is necessary to have the high tangential velocities of the rotor arms (16) as indicated in point 2 above. The number of rotor arms (16) must not be too high, and the arms (16) must not be placed too closely as this can lead to the material in the bed, to a large extent, rotating together with the rotor more or less like a solid body. The forces of friction will then mainly arise between the bed of material and the wall of the cylindrical container (12). This will result in too low heat generation to obtain effective evaporation. Furthermore, the mixing process will be ineffective, and it will be impossible to maintain a stable and dry bed of material. The other extreme, namely the distance between the rotor arms (16) being too large, is not good either. In this case, not enough of the bed material will participate in the energy transfer mechanism that is described above, which with lead to both ineffective mixing and too little evaporation. The result is that local zones with too high moisture content will arise so that the process finally breaks down.

Good results are obtained with the combination of parameters as they are given in points 3-5, and a presently preferred embodiment of the invention is a means (10) with the following characteristics:
1. Diameter of cylindrical processing chamber is around 1 m.
2. Tangential velocity at the end of the rotor arms is in the range of 30-40 m/s, preferably around 35 m/s.
3. Radial clearance between wall (12a) of the processing chamber (12) and the front area (16a) of the rotor arm (16) is about 0.03 m.
4. Number of rotor arms (16) in relation to the area of the inner wall of the cylindrical processing chamber is 30 per m$^2$.
5. Total projected front area (16a) of the part of the rotor arms which is in ingress with the bed of material viewed in the direction of movement in relation to the total volume of the bed of material is about 0.5 m$^2$/m$^3$.

A sufficiently rapid mixing is important to avoid local zones with a moisture content in the glue zone. With the typical combination of tangential velocity, clearance and diameter as indicated in points 1-3 above, the individual particles in the bed of material will be able to move about 12 times round the whole circumference of the material bed per second. This will give a mixing in tangential direction which is very rapid and effective. One will not be able to show gradients in the moisture content in a tangential direction in such a device, apart from in the area immediately downstream from the feeding points. On the other hand, the mixing time will be somewhat longer in an axial direction, as the mixing mechanism is more indirect than in the tangential direction. This can mean that one can demonstrate gradients in the oil content in the axial direction with maximum moisture values in the axial positions where feeding takes place. To succeed with the processing it is essential that feeding is regulated so that the average moisture content around the whole circumference at the feeding points is adjusted whereby the moisture content does not get up into the glue phase. A more even distribution of feeding points in an axial direction will render the process less dependent of an effective axial mixing, and an embodiment according to the invention thus relates to a means (10) where several feeding points are arranged along the axial direction of the means (10).

To create the necessary heat generation, the demand for effective mixing must also be met. The rotor arms (16) will, in the main, ensure that the particles in the bed material are thrown in a tangential direction, but movements of less systematic nature are also generated in an axial direction, ensuring axial mixing of material in the bed. This helps to collect the bed of material along the inner wall of the cylindrical container (12) with forces that greatly exceed the tendency of the force of gravity to collect material in the bottom of the container (12). The pulling forces from the steam that is generated in the bed of material are not strong enough to transport substantial amounts of material towards the centre of the container either. Therefore, the exhaust steam is led out from the processing/drying chamber itself through an outlet (20) situated as centrally as possible. This contributes to reducing the pulling along of particles in the exhaust steam to an acceptable level. Because of the rapid mixing in the processing chamber (12), the placing of the material inlet (18) or outlet (22) is not decisive for the operation of the means (10). Traditionally, these are placed at a certain distance apart.

The main difference with the means according to the invention and the solutions which are known within the field of friction dryers, is that the rotor is not equipped with fins and that the rotor blades do not have rotor hammers that can swing. The means according to the invention has a smooth processing chamber and fixed rotor blades to avoid vibration and pulsation.

The process according to the invention is very different from the processes that are used today for drying of sticky materials.

As opposed to other drying processes for drying of sticky materials, in the present invention it is not necessary to re-circulate dried material in the process.

All material only needs to pass the process once to bring it to the desired condition. This has considerable practical and process economic consequences for the facilities as arrangements for transport and immediate storage and mixing of dry material in wet material is not required.

Contrary to other drying processes that use steam or hot gas/air as a heating medium, and other friction dryers that do not have the same demands for rapid mixing, the means according to the invention is characterised in that the highest operating temperature anywhere in the process is the temperature the material is heated to in the processing chamber. This temperature can be limited to 10-20° C. above the boiling point for the liquid that one wishes to evaporate, which means great safety advantages as the danger for fire or explosion in the material is greatly reduced.

Furthermore, the abovementioned results in the process becoming more energy effective in that one avoids the heat losses which transfer of heat from one medium to another involves and also the energy which goes to heat up the heating medium. Without using some of the energy which is available in the exhaust steam from the process, the total energy consumption in the process will limit itself to 105% of the energy which is necessary to bring the material from inlet condition to outlet condition.

The process is also substantially more compact than other drying processes. The design is characterised in that the total inner volume of the processing chamber itself, where the transfer of heat and evaporation take place, can be limited to 1.5 m³ per tonne evaporated liquid per hour. This contributes to the total installation becoming much more compact than alternative drying processes, which has considerable practical consequences in connection with the installation.

Definitions

To make it easier to understand the invention, some definitions of terms and expressions that are used to describe the invention are given below:

Sticky material: Material which will cause adhesive forces between two bodies, for example between two steel plates, if it is placed between two such bodies.

$F_h$: Glue phase upper limit: The moisture content during the drying course that leads to a reduction in $$\frac{d\mu}{df},$$

where $\mu$ is viscosity and f is moisture level (see FIG. 1).

$F_g$: Glue phase lower limit: The level of moisture where the dryer material starts to show typical bulk characteristics, i.e. free flowing particles without any adhesion (see FIG. 1).

Sufficiently Rapid Mixing:

Mixing of incoming wet material in a cylindrical annular space filled with dry material which is so effective that one, with the aid of conventional processing instruments such as temperature sensors, cannot demonstrate systematic gradients in tangential direction because of lack of homogenisation. The mixing is to be regarded as sufficient even if such gradients can be shown in the axial direction of the annular space as long as the area with highest moisture content does not come below the glue phase limit.

| | |
|---|---|
| $\rho = \rho(X, t)$ | The mass density distribution of the material in the dryer chamber, where X is a position vector and where t = time. |
| $f = f(X, t)$ | Distribution of the material moisture content in the processing chamber. |
| $\dot{m}_i$ | Feeding rate |
| $f_i$ | Moisture level in the feed |
| $\dot{e}$ | Rate of evaporation from the processing chamber |
| $\dot{m}_u$ | Output rate |
| $f_u$ | Actual value of f(X, t) for outgoing material. |
| V | Volume in which the drying takes place. X refers to positions in this volume. |

The strength of the means in relation to other dryers is first and foremost the ability to break through the glue phase. On the other hand it can be a disadvantage that all the energy which is needed to evaporate the amount of water which shall be removed must be supplied as mechanical energy. Where there is a need for high rates of evaporation, this requires the installation of very large drive motors, something which can be difficult practically. Another point which can limit the widespread use of the device is that the industry is familiar with and technically disposed towards the use of steam or other heat media for drying. Large steam boilers are already installed with many potential users of the drying technology, and these are in many instances installed to produce steam from various waste products, such as, for example, wood chips and bark from the paper industry. It will then be difficult to get acceptance for another dryer technology that result in use of completely different energy sources.

To get a favourable total solution, the means and process according to the invention can be combined with conventional drying techniques. In many cases the material that shall be dried will be of a quality that leads to most of the evaporation taking place before the material enters the glue phase. One can in practice let a traditional steam heated dryer take care of the evaporation up to the upper glue phase limit, and from there the material is dried off with a process and means according to the invention.

In many cases, sludge that shall be dried has a dry matter content of around 20% and a glue phase which starts at 45-50% dry matter. If one lets a steam heated dryer bring the material from 20% to 40% dry matter, it will remove 500 kg water per tonne sludge in this part of the process. Further drying with the process and method according to the invention to typically 90% dry matter will give an evaporation of a further 278 kg water per tonne initial sludge. As the sludge is also pre-heated in the first processing step, the necessary energy consumption will be only 30-35% of the total energy need for the drying. The rest of the energy is used in the steam-heated dryer that now accounts for 65-70% of the evaporation in the combination process. Another beneficial effect with this combination process is that the steam-heated dryer now works exclusively in the wet zone with the resulting very good heat transfer conditions.

One can also imagine other combination processes based on the invention and traditional dryer technology. As mentioned previously, it is common in conventional dryers to avoid the problems created in the glue phase by re-circulating large amounts of dried material. An alternative is to dry a sub-stream of material completely with a process according to the invention, and then blend it with untreated sludge to a consistency that it is possible to treat in traditional dryers such as an indirect steam-heated dryer or hot air dryer. This strategy can also be chosen if one wishes a considerably higher residual moisture level than what the invention can manage.

In addition to the combination processes described above, where the process and means according to the invention are used either on parts of the drying course or on a sub-stream of the material, one can also use combination processes where the traditional drying principle is built into the means according to the invention. A combination with an indirectly heated dryer can be realised by equipping the stator, rotor or both parts with heating surfaces, so that the capacity of the dryer increases without the need for a larger drive unit. Because of the very intense mixing which is created with the means according to the invention, it becomes possible to use higher temperatures on these heating surfaces than in traditional indirect dryers without this leading to problems such as material being burnt to the surfaces and overheating. A combination of the principle according to the invention and a directly heated dryer such as for example a hot air dryer, also gives a process with unique characteristics. In such a process a large part of the energy for the evaporation is supplied in the form of hot gas directly to the processing chamber. The intense mechanical stirring will ensure effective transfer of the heat in the gas to the material which shall be dried. This leads to an increase in the capacity without increasing the size of the drive unit. Both these combination processes lead to considerable changes in construction and control principles for the process, but the unique character of the invention will still be the main reason for the process operating without problems with the material which is in the glue phase.

What is claimed is:

1. Process for drying sticky materials in a single rotating drying means characterized in that the process comprises the steps:
    a) establishing a ring shaped bed of material in the processing chamber of the single rotating drying means wherein said ring shaped bed comprises an amount of material $M(t)=\int p \, dV$ with a moisture level of $F(t)=1/M \int pf \, dV$ where $F(t)<f_g$ with $f_g$ being the glue phase lower limit, and
    b) that to this amount $M(t)$ is added an amount of wet material $m_i$ with a moisture content $f_i$, where $f_i>f_h$, where $f_h$ is the glue phase upper limit, and
    c) that the relationship between $m_i*f_i$ and $M(t)*F(t)$ is regulated so that $F(t)<f_g$, and
    d) that sufficient fast mixing is established to maintain the mixture of said ring shaped bed and said added wet material below the glue phase lower limit $f_g$ so that $f(X,t)<f_g$.

2. Process in accordance with claim 1 wherein the moisture content of the total material, $F(t)$, is regulated to $F(t)<f_g$ by the amount supplied of $m_1$ being regulated.

3. Process in accordance with claim 1 characterised in that the evaporation $\alpha$ is obtained by rotor blades being arranged in the means and by these blades coming into contact with material, establishing collision, contact and friction forces sufficient to evaporate the supplied moisture.

4. Process in accordance with claim 1 wherein the material in the processing chamber has a temperature above the evaporating temperature at the actual pressure to make the evaporation of water more effective.

5. Process in accordance with claim 1 wherein the drying takes place under reduced pressure.

6. Process in accordance with claim 1, wherein the rate of evaporation $\alpha$ is increased by heat being fed through the walls of the processing chamber or by heat carriers in the form of hot gas being fed directly into the processing chamber.

7. Process in accordance with claim 1, characterised in that the feeding occurs over the whole length of the dryer over several feed inlets.

8. Process in accordance with claim 1, means are arranged to monitor the material in the processing chamber, so that if the material moves towards the glue phase, then this will be communicated to a control device which controls the feeding of new material $m_1$.

9. Process in accordance with claim 8, wherein these means comprise a sensor that indicates the moisture level in the material, $F(t)$.

10. Process in accordance with claim 8, wherein these means comprise devices that measure the collision, contact and friction forces which must be brought about.

11. Process in accordance with one of the claims 1-10, wherein the process is used in combination with other conventional drying processes.

12. Process in accordance with claim 11, wherein the material which shall be treated is first dried in a conventional indirect dryer until the material has a moisture content near the upper glue phase limit.

13. Process in accordance with claim 12, wherein and that the resulting dry material is re-circulated with untreated material to a consistency which can be treated in a conventional indirect dryer.

14. Process in accordance with claim 1 wherein a rotating rotor with rotor arms establishes said ring shaped bed of material with a tangential velocity at a tip of said arm in the range of from 10 to 100 meters per second.

15. A process for drying sticky material comprising the steps of
    obtaining a mass of sticky material;
    establishing a rotating annular bed of the material from a portion of said mass of material with a moisture content below the glue phase lower limit of the material;
    adding untreated material with a moisture content above the glue phase $f_g$ upper limit of the material from said mass directly to said annular bed in an amount to maintain the total moisture content of said bed and said added material below the glue phase lower limit of said materials;
    rapidly mixing the added material with said bed of material to obtain a mixture thereof while supplying a larger amount of kinetic energy to an inner circumferential part of said bed of material than the average kinetic energy in the remainder of said bed of material for conversion to heat energy to evaporate moisture from said mixture; and delivering a flow of dried material from said mixture at a moisture content below the glue phase lower limit of the material and at a rate sufficient to maintain said annular bed of material.

16. An apparatus for dying a sticky material comprising a cylindrical processing chamber and a rotor rotatably mounted in said chamber for establishing within said chamber a rotating annular bed of material obtained from a predetermined mass of the material outside said chamber and with a moisture content below the glue phase lower limit of the material;

at least one inlet to said chamber for adding material with a moisture content above the glue phase upper limit of the material from said mass to said annular bed in an amount to maintain the total moisture content of said bed and said added material below the glue phase lower limit of said materials;

a plurality of rotor arms on said rotor for rapidly mixing the added material with said bed of material to obtain a mixture thereof while supplying a larger amount of kinetic energy to an inner circumferential part of said bed of material than the average kinetic energy in the remainder of said bed of material for conversion to heat energy to evaporate moisture from said mixture; and at least one outlet from said chamber for delivering a flow of dried material from said mixture at moisture content below the glue phase lower limit of the material and at a rate sufficient to maintain said annular bed of material.

17. An apparatus as set forth in claim 16 wherein each said rotor arm is radially spaced from an inner surface of said processing chamber by an amount of up to 0.1 m.

18. An apparatus as set forth in claim 16 wherein the number said rotor arms in relation to the area of an inner cylindrical inner surface of said processing chamber is of the order 10 to 100 per square meter.

19. An apparatus as set forth in claim 16 further comprising a plurality of sensors in said chamber for sensing the moisture content of said bed of material and the temperature of said bed of material and a control unit operatively connected to said sensors for controlling an input of fresh material into said chamber and the output of dried material from said chamber.

* * * * *

UNITED STATES PATENT AND TRADEMARK OFFICE
CERTIFICATE OF CORRECTION

PATENT NO. : 7,562,465 B2
APPLICATION NO. : 10/477617
DATED : July 21, 2009
INVENTOR(S) : Asbjørn Strand Page 1 of 1

It is certified that error appears in the above-identified patent and that said Letters Patent is hereby corrected as shown below:

Column 7, line 10, change "cart" to -- can --

Column 10, line 28, change "m&i    feeding rate" to -- $m_l$    feeding rate -- line 30, change "άx" to -- ά -- line 32, change "m&u" to -- $m_u$ --

Signed and Sealed this

Eighth Day of September, 2009

David J. Kappos
*Director of the United States Patent and Trademark Office*